(12) United States Patent
Durand (10) Patent No.: US 8,813,191 B2
(45) Date of Patent: Aug. 19, 2014

(54) METHOD AND APPARATUS FOR CONTROLLING THE NUMBER OF DEVICES INSTALLED IN AN AUTHORIZED DOMAIN

(75) Inventor: Alain Durand, Rennes (FR)

(73) Assignee: Thomson Licensing, Boulogne Billancourt (FR)

( * ) Notice: Subject to any disclaimer, the term of this patent is extended or adjusted under 35 U.S.C. 154(b) by 1498 days.

(21) Appl. No.: 12/223,882

(22) PCT Filed: Feb. 15, 2007

(86) PCT No.: PCT/EP2007/001336
§ 371 (c)(1),
(2), (4) Date: Jun. 16, 2010

(87) PCT Pub. No.: WO2007/093426
PCT Pub. Date: Aug. 23, 2007

(65) Prior Publication Data
US 2010/0306823 A1 Dec. 2, 2010

(30) Foreign Application Priority Data
Feb. 15, 2006 (EP) .................................. 06290257

(51) Int. Cl.
*H04L 29/06* (2006.01)
*H04N 21/442* (2011.01)
*G06F 21/10* (2013.01)
*H04N 21/436* (2011.01)
*H04N 21/4627* (2011.01)
*H04W 60/00* (2009.01)
*H04L 12/28* (2006.01)

(52) U.S. Cl.
CPC .......... *H04L 63/10* (2013.01); *H04N 21/44227* (2013.01); *G06F 21/10* (2013.01); *H04L 2463/101* (2013.01); *H04W 60/00* (2013.01); *H04N 21/43615* (2013.01); *H04L 63/107* (2013.01); *H04N 21/4627* (2013.01); *H04L 12/2803* (2013.01); *H04L 12/2807* (2013.01)
USPC ................ 726/4; 713/150; 713/153; 713/155

(58) Field of Classification Search
CPC ... G06F 21/10; H04L 63/10; H04N 21/43615
USPC ............................................................. 726/4
See application file for complete search history.

(56) References Cited

U.S. PATENT DOCUMENTS 6,469,991 B1 * 10/2002 Chuah ........................... 370/329
7,752,433 B2 7/2010 Yamauchi et al.
(Continued)

FOREIGN PATENT DOCUMENTS

| CN | 1866857 A | 11/2006 |
| EP | 1564621 | 8/2005 |

(Continued)

OTHER PUBLICATIONS

Agrawal et al., a Testbed for Mobile Networked Computing, Jun. 1995, IEEE International Conference on Communications, vol. 1, pp. 410-416.*

(Continued)

*Primary Examiner* — Taghi Arani
*Assistant Examiner* — Kenneth Chang
(74) *Attorney, Agent, or Firm* — Robert D. Shedd; Jeffrey M. Navon (57) ABSTRACT

The number of devices installed in an Authorized Domain is controlled by a master device functionality. This master devices stores ceiling values for the total number Total_limit of devices to be installed in the AD; the total number Local_limit of devices to be installed in a local proximity with the master device and the total number Remote_limit of devices to be installed remotely from said master device. The master device also stores current values of the number Local_count of devices installed in the AD in local proximity with the master device; and the number Remote_count of devices installed in the AD remotely from said master device. When a new device is to be installed in the AD, the ceiling values are checked with respect to the current values and it is checked whether the device is in local proximity with the master device to authorize or not its installation in the AD, either locally or remotely.

14 Claims, 5 Drawing Sheets

(56) References Cited

U.S. PATENT DOCUMENTS

| | | | |
|---|---|---|---|
| 2002/0114469 A1* | 8/2002 | Faccin et al. | 380/270 |
| 2002/0152173 A1* | 10/2002 | Rudd | 705/57 |
| 2002/0188845 A1* | 12/2002 | Henderson et al. | 713/168 |
| 2004/0103312 A1* | 5/2004 | Messerges et al. | 713/201 |
| 2005/0114650 A1* | 5/2005 | Rockwood et al. | 713/155 |
| 2005/0149730 A1* | 7/2005 | Aissi et al. | 713/168 |
| 2005/0168323 A1* | 8/2005 | Lenoir et al. | 340/5.74 |
| 2005/0182727 A1* | 8/2005 | Robert et al. | 705/51 |
| 2005/0210291 A1 | 9/2005 | Miyawaki et al. | |
| 2006/0015502 A1* | 1/2006 | Szucs | 707/9 |
| 2006/0208878 A1* | 9/2006 | Nowlan | 340/539.13 |
| 2006/0280139 A1* | 12/2006 | Brace et al. | 370/324 |
| 2007/0180497 A1* | 8/2007 | Popescu et al. | 726/4 |

FOREIGN PATENT DOCUMENTS

| | | |
|---|---|---|
| JP | 2004110816 | 4/2004 |
| WO | WO9955052 | 10/1999 |
| WO | WO2004003856 | 1/2004 |
| WO | WO2004038568 | 5/2004 |
| WO | WO2007033553 | 3/2007 |

OTHER PUBLICATIONS

Search Report Dated Jul. 30, 2007.

* cited by examiner

METHOD AND APPARATUS FOR CONTROLLING THE NUMBER OF DEVICES INSTALLED IN AN AUTHORIZED DOMAIN

This application claims the benefit, under 35 U.S.C. §365 of International Application PCT/EP2007/001336, filed Feb. 15, 2007, which was published in accordance with PCT Article 21(2) on Aug. 23, 2007 in English and which claims the benefit of European patent application No. 06290257.2, filed Feb. 15, 2006.

FIELD OF THE INVENTION

The present invention relates generally to content protection in communication networks and more particularly to Authorized Domain Management.

BACKGROUND OF THE INVENTION

The notion of Authorized Domain (AD) has been defined recently as a set of devices belonging to members of a same household for receiving, storing or consuming contents. In this context, household should not be viewed as a single location (the main home). An Authorized Domain can indeed include devices located in a vacation home, in a car or even hand-held devices.

Figure 1:
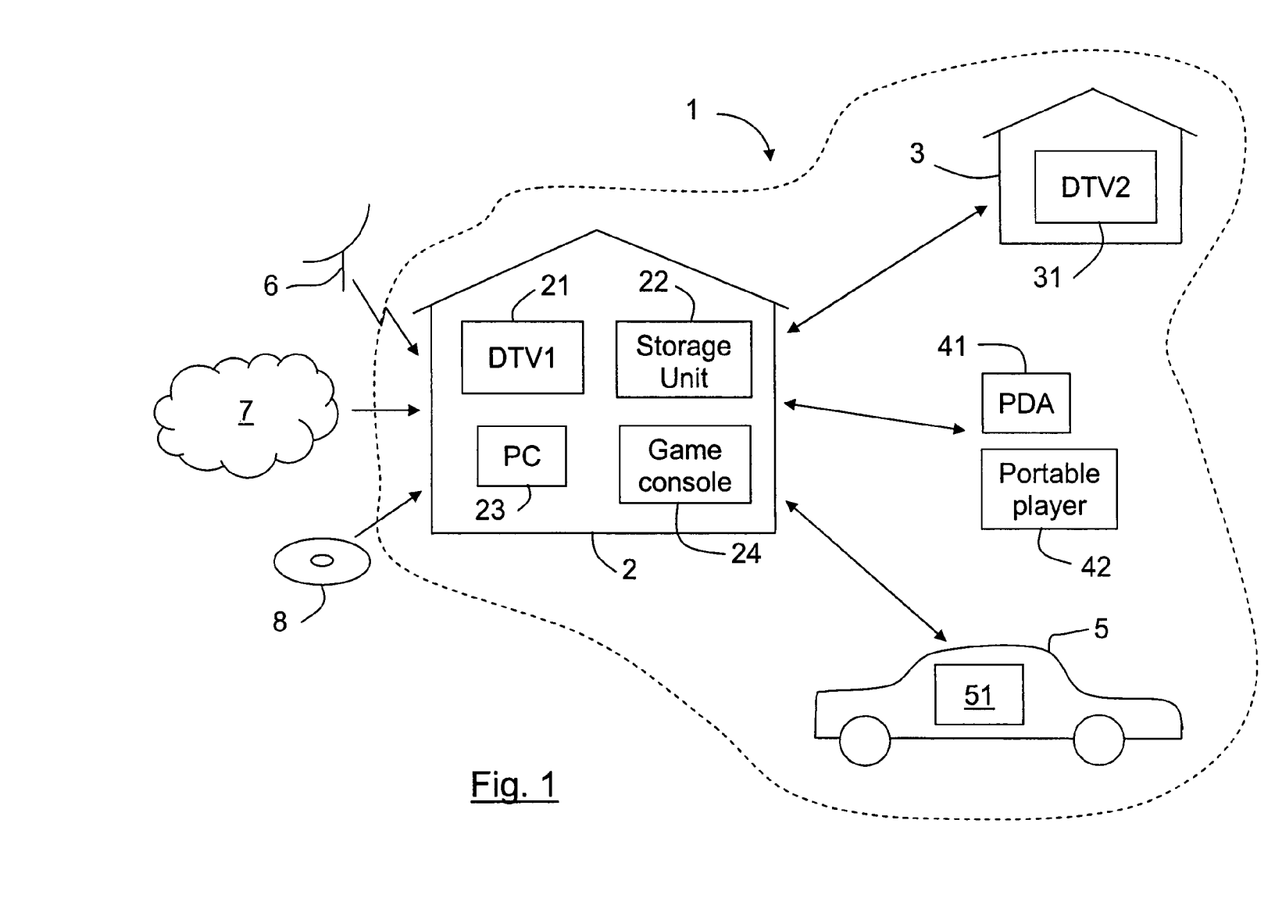
FIG. 1, discussed hereinabove, illustrates an example of a typical Authorized Domain.

FIG. 1 illustrates an example of Authorized Domain 1 comprising a set of devices located in the main house 2: a digital television 21, a personal computer 23, a game console 24 and a storage unit 22; another digital television 31 located in a second house 3; mobile devices such as a Personal Digital Assistant 41 and a portable player 42 which can be brought outside the house and a mobile device 51 located in a car 5 (e.g. portable video player). Contents can be delivered to devices of the Authorized Domain in several ways: it can be a broadcast content received via an antenna 6 for example; it can be a broadband, on-demand content received via an open network such as Internet 7 or it can be a content stored on a medium such as optical disc 8.

Several groups (e.g. the TV-Anytime Forum or DVB-CPT—Digital Video Broadcasting Content Protection Technical sub-group of the DVB organization) have worked in the past years on Authorized Domain notion. Implementation solutions have also been proposed by the industry such as the SmartRight™ proposal (information about which can be found at www.smartright.org).

Within an Authorized Domain, devices are often distinguished depending on the role they play regarding the content. In the SmartRight™ system for example, the content enters the Authorized Domain via an Access Device (also called Acquisition Device), it is stored within a Storage Entity and consumed or exported by a Presentation Device. Similar functional entities are defined in the DVB-CPCM System ("CPCM" standing for "Content Protection & Copy Management"), currently specified by the DVB-CPT, and are illustrated in FIG. 2.

Figure 2:
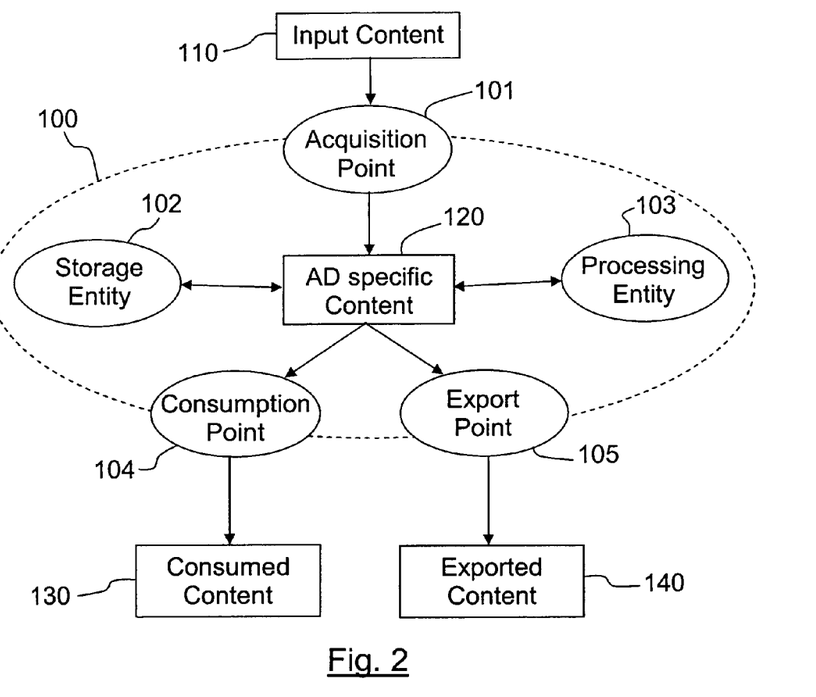
FIG. 2, described previously, illustrates the different types of devices in an Authorized Domain.

In FIG. 2, an Input Content 110, delivered by a content provider, enters in an Authorized Domain 100 via an Acquisition Point 101. This entity performs some actions on the Input Content to obtain a content 120 specific to the Authorized Domain. This AD specific Content 120 can be stored within the Authorized Domain by a Storage Entity 102 to be later consumed. It can be processed by a Processing Entity 103 (e.g. to perform a compression to transfer the content to a low-resolution device). Finally this AD specific Content can be consumed via a Consumption Point 104 where the content is rendered (e.g. in the form of sound and images) to a user to obtain what is called a Consumed Content 130. The AD specific Content can also be exported via an Export Point 105 to obtain an Exported Content 140 which is no more protected by the Authorized Domain rules and preferably protected by another system. It is of course possible to implement two or more of the previously mentioned functionalities in a single appliance (e.g. a set-top box having an internal hard disk drive is at the same time an Acquisition Point and a Storage Entity; an Integrated Digital Television with an analog output is a Consumption Point and an Export Point).

It is to be noted that an AD specific Content is bound to the Authorized Domain in which this content has been obtained, if such a binding is required by the content provider (in usage rights attached to the Input Content for example). This means that such AD specific Content can be consumed in every Consumption Point of the Authorized Domain but cannot be consumed in any device of a different Authorized Domain.

Authorized Domain management is therefore very important to limit the size and/or extent of the Authorized Domain. Users would indeed have interest in unlimited Authorized Domain in order to be able to share their contents with others but content providers require that the size of an Authorized Domain be limited to the needs of members of a single household only.

A basic solution would be to limit the total number of devices within an Authorized Domain but it is difficult to estimate the 'normal' number of devices for a single household. In addition, counting only the number of devices would have undesirable side effects. For example, two storage entities of 1 MByte each (e.g. USB keys) would be counted as two devices whereas one storage entity of 10 GBytes (e.g. hard disk drive) would count only for one device.

There is therefore a need for a secure solution to limit the size/extent of an Authorized Domain which would be transparent and unnoticed by a majority of honest users but which would prevent rogue users to circumvent it.

SUMMARY OF THE INVENTION

The invention is directed to a method for controlling the number of devices installed in an Authorized Domain containing at least one master device, said master device being able to store ceiling values for:
  the total number Total_limit of devices to be installed in the Authorized Domain;
  the total number Local_limit of devices to be installed in a local proximity with the master device and
  the total number Remote_limit of devices to be installed remotely from said master device;
  the method comprising the steps, when the master device receives an installation request from a new device, of:
  verifying that the Total_limit has not been reached and,
  in case of positive verification, checking whether the new device is in local proximity with the master device and,
  in case the new device is found to be local, verifying that the Local_limit has not been reached before allowing local installation,
  in case the new device is found to be remote, verifying that the Remote_limit has not been reached before allowing remote installation.

According to particular embodiments of the invention:
  the ceiling value Local_limit is greater than the ceiling value Remote_limit;
  the ceiling value Total_limit is greater than the sum of the ceiling values Local_limit and Remote_limit.

According to another embodiment, the master device is furthermore able to store current values of the number Local_ count of devices installed in the Authorized Domain in local proximity with the master device; and the number Remote_count of devices installed in the Authorized Domain remotely from said master device; and the method further comprises, in case the new device is found to be local and in case the number Local_count is equal to or greater than the Local_limit, a step of checking that the number of devices installed in the Authorized Domain, and which are connected at this time in local proximity with the master device, is greater than a predetermined quorum of the number Local_count; wherein the new device is locally installed should said checking be positive.

According to other particular embodiments:

the Local_count is incremented when the new device is installed locally; or the Remote_count is incremented when the new device is installed remotely;

the Local_count or the Remote_count are incremented only when the new device is able to consume and/or to export content;

the Local_count or the Remote_count are incremented by one unit when the new device is able to consume and to export content;

when a device that was installed remotely in the Authorized Domain is found to be in local proximity with the master device, then the Local_count is incremented while the Remote_count is decremented;

the method further comprises a step of splitting the master device functionality between two apparatuses, said splitting step comprising splitting the ceiling values Total_limit, Local_limit and Remote_limit and the current values Local_count and Remote_count being between the two master devices.

The invention is also directed to an apparatus containing master device functionality for controlling the number of devices installed in an Authorized Domain, comprising:

a memory able to store ceiling values for the total number Total_limit of devices to be installed in the Authorized Domain; the total number Local_limit of devices to be installed in a local proximity with the master device and the total number Remote_limit of devices to be installed remotely from said master device;

the memory being able to store current values of the number Local_count of devices installed in the Authorized Domain in local proximity with the master device; and the number Remote_count of devices installed in the Authorized Domain remotely from said master device; and means for implementing the method to control the installation of new devices in the Authorized Domain as described previously.

BRIEF DESCRIPTION OF THE DRAWINGS

The various features of the present invention and its preferred embodiments will now be described, by way of example only, with reference to the accompanying drawings in which.

DESCRIPTION OF THE PREFERRED EMBODIMENTS

In an Authorized Domain managed according to the invention, three different size counts are handled:

one (Local_count) for the number of devices installed within the location;

one (Remote_count) for the number of devices installed from a remote location; and one (Total_count) for the total number of devices installed in the Authorized Domain (this Total_count is in fact the total of the two previous ones).

Preferably, only the devices performing Consumption point or Export point functionalities are taken into account for these counts.

These counts are maintained by a master device which is the only one able to install Consumption and Export Points in the Authorized Domain. Acquisition Points, Storage and Processing Entities can be installed by any device from the Authorized Domain.

The master device functionality can be implemented in any device of an Authorized Domain and is preferably implemented in a single device of the AD. A master device is a device 200 as illustrated schematically in FIG. 3 which contains a secure processor (CPU 201) and a secure memory 202. The security (which is symbolized by a rectangle in dotted line in FIG. 3) of these components can be implemented using a smart card or platform of TCPA type (TCPA standing for "Trusted Computer Platform Alliance"). Obfuscation techniques exist as well for both securing memory and processing. These techniques can be used solely or in conjunction with smart cards or TCPA. The secure memory 202 is able to store the Local_count and the Remote_count for the Authorized Domain to which the master device 200 belongs. The Total_count is also stored, in one embodiment, in the secure memory 202. Alternatively, the Total_count is not stored as a separate count in memory 202; it is deduced from the two other counts each time it is necessary to check the total number of installed devices in the AD.

Figure 3:
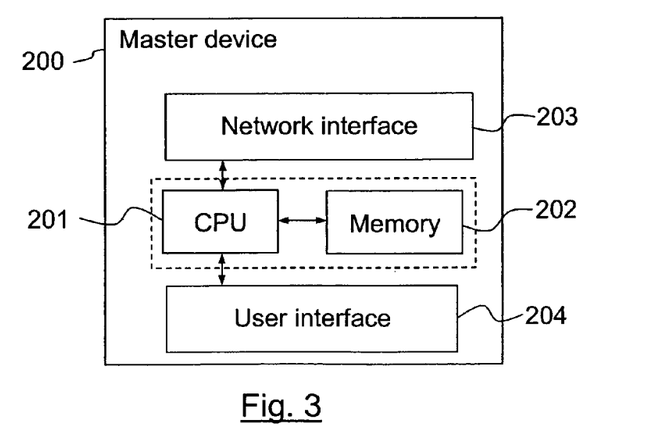
FIG. 3 illustrates schematically a block diagram of a particular device called a master device.

The CPU 201 is able to execute a program implementing a method that will be explained latter in order to control the size/extent of the AD.

The master device 200 further comprises a network interface 203 for connection, permanently or temporarily, to a home network and/or to an open network for communication with other devices of the AD. The network interface 203 is able to implement known protocols for wired and/or wireless transmission, such as IP, IEEE 1394 or 802.11b. The master device 200 also preferably comprises a user interface 204.

The notion of local or remote location of a given device is defined with respect to the master device. For example, in the Authorized Domain shown in FIG. 1, if the master device is the PC 23, then, the DTV1 21 which is a kind a consumption point will be counted in the Local_count whereas the DTV2 31 will be counted in the Remote_count stored in master device 23. As for the portable player 42 which is another kind of consumption point, it will be considered as local (and be counted in the Local_count) if it was local to the master device 23 at the time of its enrollment in the AD. This does not prevent the portable device to be used later outside of the main home 2. We will see later that it is also possible, in an alternative embodiment, to split the master functionality between two or more devices which are preferably remote from each other.

For each of the three counts that have been mentioned previously, an upper limit is also defined and stored in the master device. These limits are such that:
- the Total_limit is high (a normal user shall never reach this limit);
- the limit for remotely installed devices Remote_limit is low (in order to control remote installations);
- the limit for local installed devices Local_limit is fair; and
- the addition of the Remote_limit and Local_limit should be far lower than the total limit.

When a request for installing a new device in an AD is received by the master device of this AD, the following rules will apply:

If the Total_count reached the Total_limit, then the installation is refused.

If the new device is remote and the Remote_count reached the Remote_limit, the installation is refused.

If the new device is local and the Local_count is equal to or greater than the Local_limit, then a quorum test is performed. This test consists in checking the number of devices of the AD which are connected at this time within the proximity of the master device. The master device broadcasts to this end a message on the network to which it is connected and only responses coming from the devices of this AD and located in the proximity of the master device will be accepted. The quorum test passes only if the number of accepted responses represents a certain quorum of the Local_count. If the test fails, the installation of the new device is refused. Alternatively, the quorum test may be based on a certain quorum of the Total_count.

In all other cases, installation of the new device occurs. The Total_count is incremented. If the new device is in the proximity of the master device, the Local_count is incremented as well, otherwise the Remote_count is incremented.

The ceilings Total_limit, Remote_limit and Local_limit are determined by an independent authority which decides which numbers are fair for 'normal' users. These limits are entered in all devices which can possibly act as master devices, preferably during manufacturing. The independent authority further defines rules for authorizing Agents (e.g. software module in a device or specific users), once authenticated, to update these ceilings. In case a user is affected by one or several of the ceilings, this user can request the Authenticated Authorized Agent to increase one or several ceilings.

It is to be noted that the master functionality can be transferred from one device to another device of the AD. This transfer should preferably be only possible locally or the number of remote transfers should be limited. In such a case, the current counts and ceilings shall be transferred as well to the new master device.

In case a user of the household decides to remove one device from the Authorized Domain (for example to sell it or to lend it to a user outside of this household), the Local_count or Remote_count will be decremented depending upon the removed device's location detected by the master device and the Total_count will be decremented as well. In case a device is lost or stolen, it is no more able to exchange messages with the master device and therefore it is no more able to run the proximity test (used to detect a device location, as will be explained later) with the master device. In this case, we chose preferably to decrement the Local_count. The Total_count is also decremented. It is to be noted that if the relevant count (Remote_count or Local_count) is already 0, the other count will be decremented.

In one embodiment of the invention, a mechanism (which is detailed later in the description) is provided to re-balance the Local_count and the Remote_count if, for instance, one remotely installed device is later found to be local (e.g. a portable player brought during vacation is first installed remotely from the master device and is then connected to the home network of the main house).

As mentioned previously, it is also possible to split the master functionality into two (or more) to obtain two or more master devices in one Authorized Domain. In this case, the three counts Local_count, Remote_count and Total_count as well as the ceilings Local_limit, Remote_limit and Total_limit should also be split between the master devices. For instance, the addition of the Local_count1 and Local_count2 of two master devices after the split should equal the Local_count of a previous unique master device. The balance of the counts between the master devices may be decided automatically (e.g. equally shared between master devices) or it may be decided by the user of the AD performing the splitting of master devices. An upper limit is preferably set for the number of splits of the master functionality and is stored, with the other counts and ceilings, in a secure memory of the master device.

In an alternative embodiment, it is not necessary to split the ceiling Total_limit when other counts and ceilings are split. Also, it should be noted that, contrary to the transfer of master functionality which is limited if transferred remotely or may be restricted to local transfers, it is preferable to allow splitting of the master functionality between remote devices. Splitting is actually mainly interesting to allow the user having a master device in each of the AD location.

Figure 4:
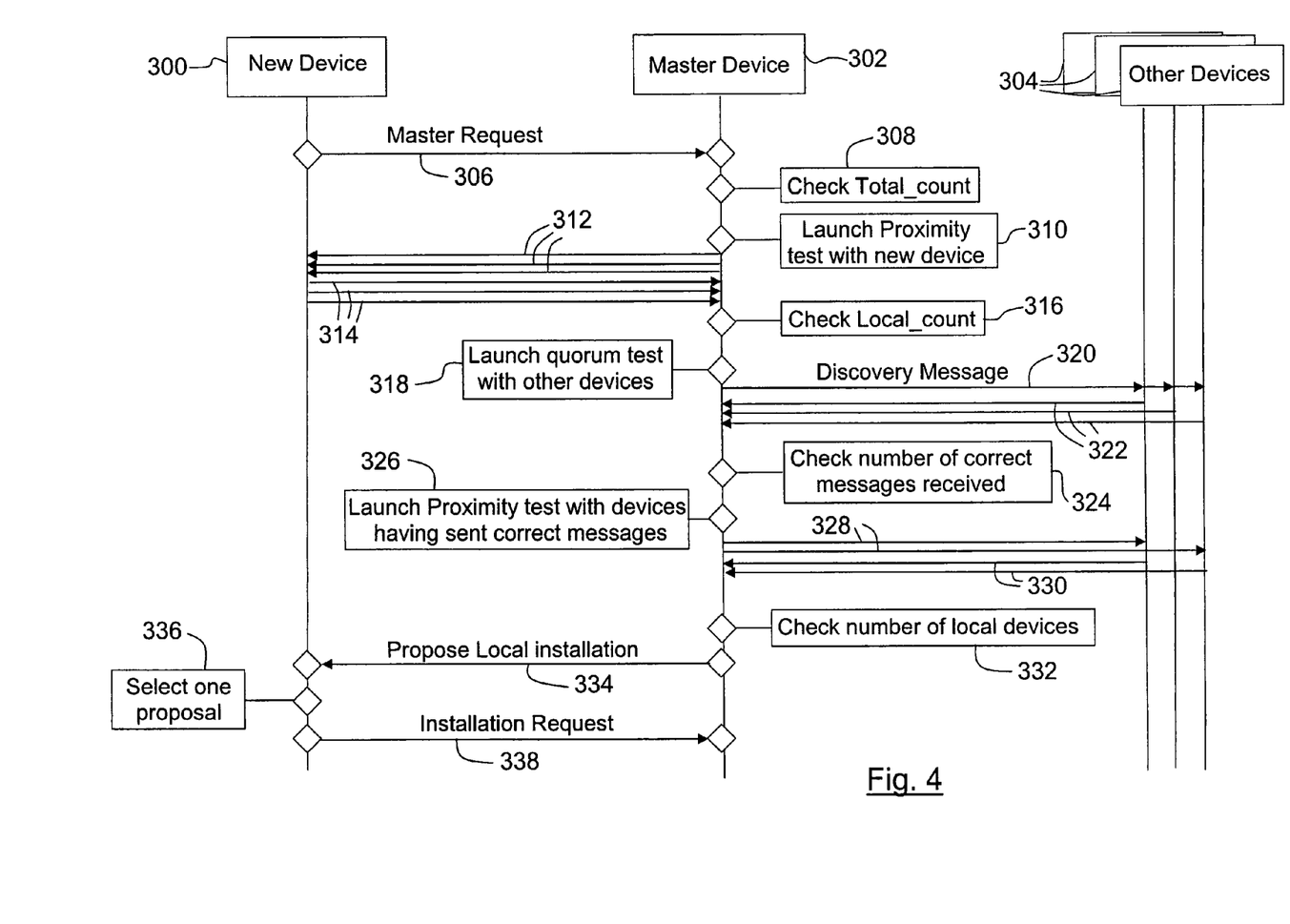
FIG. 4 illustrates messages exchanged between a new device to be installed in an Authorized Domain and a master device of this AD as well as with other devices of this AD in a particular example of local installation.

In FIG. 4, we have shown an example of installation of a new device 300 in an Authorized Domain having already a master device 302 and other devices 304 installed. When connecting to a home network, a new device 300 broadcasts in a step 306 a Master Request message on the network requesting a master device to answer. Other devices of the network answer only if they are master. In FIG. 4, we suppose that the master device 302 has received the Master Request message. The master device then checks in step 308 the value of the Total_count. If Total_count is less than the ceiling Total_limit, then the master device launches in step 310 a Proximity test with the new device to know whether the new device is to be counted as a local device or as a remote device with respect to the master device location.

The Proximity test preferably uses a method for secure measure of time-based distance between two devices disclosed in European patent application No. 05 300 494.1 filed on Jun. 20, 2005 by the applicant of the current European patent application. To this end, the master devices 302 sends a series of "ping" commands 312 to the new device 300 and waits for the "ping" responses 314. For each response received 314, the master device calculates an associated time-based distance called Round Trip Time (RTT). If the master device obtains one RTT lower than a given limit (e.g. 7 ms), it considers that the new device is in its local proximity and it sends a further message (not shown on FIG. 4) to the new device requesting authentication data (as explained in the above-mentioned patent application). The authentication data sent by the new device in response to this request are verified by the master device in order to be sure of the origin of the ping responses used to calculate the RTT. If all these verifications by the master device succeed, the new device is considered to be local. Otherwise, the new device is considered to be remote.

If the new device is remote, the master device checks the Remote_count. If Remote_count is less than the Remote- _limit, then the master device proposes a remote installation to the new device. Otherwise (Remote_count greater than or equal to Remote_limit), the master device sends a message to the new device signaling that the installation is refused.

If the new device is local (as is the case in the example of FIG. 4), the master device checks (step 316) the Local_count. If Local_count is less than the Local_limit, then a local installation is proposed to the new device. In case Local_count is greater than or equal to Local_limit, the master device launches a quorum test with other devices of the network (step 318 in FIG. 4): it first broadcasts a discovery message 320 on the network. This discovery message preferably contains a random number R (generated or obtained by the master device) and an Authorized Domain identifier AD_ID as challenge. Every Authorized Domain, once established, has a unique identifier AD_ID known by all the installed devices of the AD.

When other devices 304 of the AD receive the discovery message, they answer with messages 322 containing their own identifier Device_ID and authentication data computed on the random number R and their own identifier Device_ID using a secret key. Preferably the authentication data is computed using the HMAC-SHA1 function and a secret key of the Authorized Domain AD_key. In an Authorized Domain, all installed devices usually share a secret key specific to the AD: AD_key. Alternatively, a session key established in a Secure Authenticated Channel (SAC) and shared between the master device and the device 304 computing the answer message 322 may be used to compute the authentication data.

The master device 302 then checks the validity of the received answers (by verifying the authentication data in the messages 322) to ensure it received only responses from devices of the Authorized Domain and it checks (step 324) that the number of correct answers is enough to pass the quorum test. For example if the ratio for the quorum is ½, half of the number of local devices (i.e. Local_count/2) should be present. It is therefore checked at step 324 that the number of correct answers received is greater than Local_count/2. If this checking succeeds, the master device 302 launches at step 326 a Proximity test with each of the other devices 304 having sent correct answers 322. This Proximity test is performed as explained previously: "ping" commands 328 are sent from the master device to each concerned other device 304 and "ping" responses 330 are received from each other device and checked later in the master device with authentication data.

The master device then counts all the devices that passed the Proximity test (i.e. those which are in its local proximity) and checks (step 332) that this number is greater than the number necessary for the quorum (i.e. greater than Local_count/2 with the above example). If the quorum test passed (as in the example shown in FIG. 4), the master device proposes a local installation (step 334) to the new device. Otherwise, the master device sends to the new device a message signaling that the installation is refused.

When the new device receives an installation proposal from one or several masters (in case the master functionality is split among two or more devices), it asks the user to select one proposal (step 336), with preferably a priority to the master(s) proposing a local installation. Then the new device sends an installation request (step 338) to the master device chosen and the installation process starts (update of the counts in master device, sending of the identifier AD_ID and possibly the secret key AD_key of the Authorized Domain to the new device which become a domain device, etc.).

Figure 5:
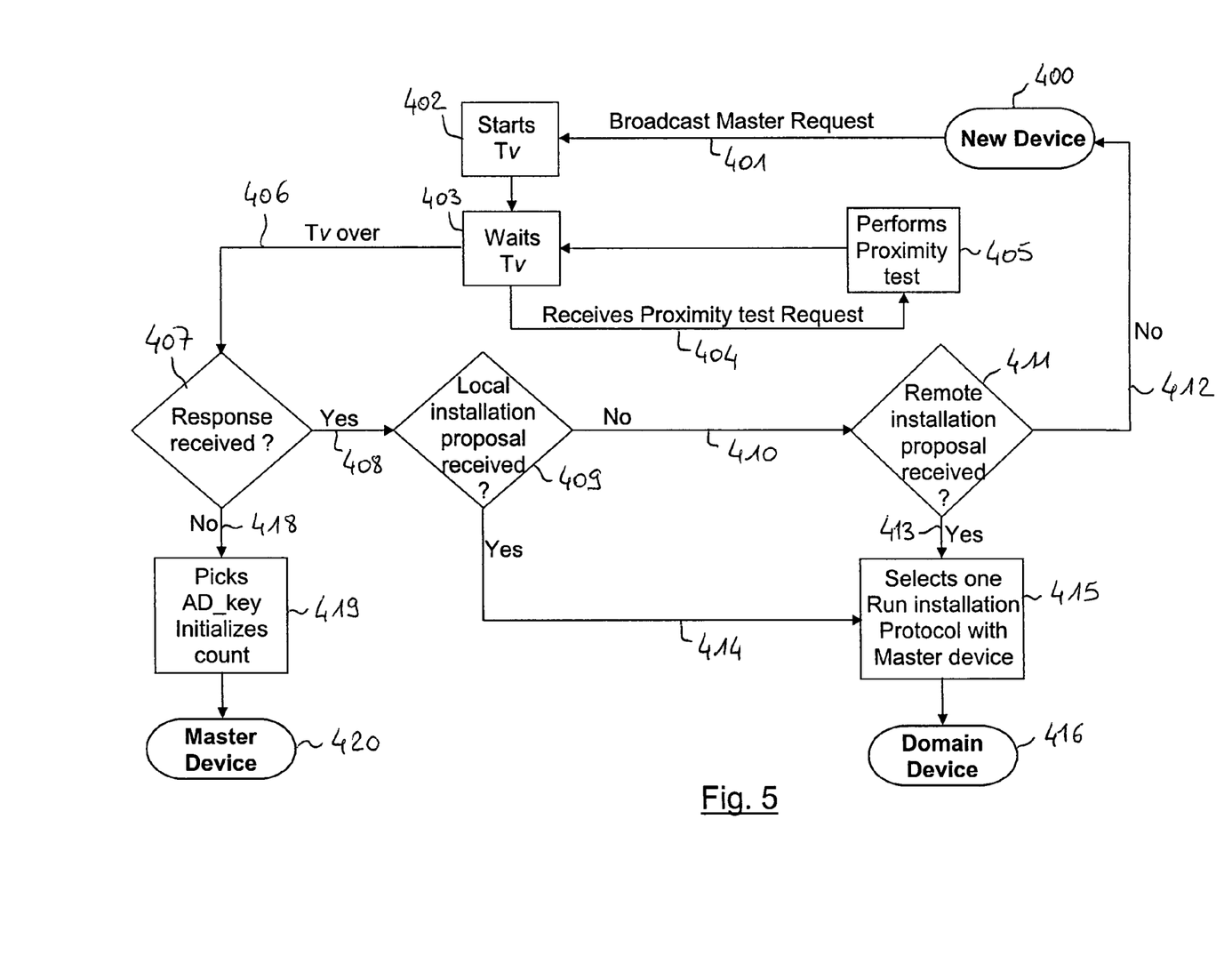
FIG. 5 and FIG. 6 illustrate state diagrams respectively of a new device to be installed in an Authorized Domain and of a master device of this Authorized Domain.

We will now explain with reference to FIG. 5 the protocol of Authorized Domain size management from the standpoint of a new device requesting to be installed in the AD.

The device is first in a 'New Device' state 400. From this state, it broadcasts 401 a Master Request message when it is first connected to a home network. Then it starts 402 a time-out Tv and waits 403 during the predetermined time Tv. During this waiting, if the device receives a Proximity test request (in the form of "ping" commands for example), it performs the Proximity test 405 with the master device having sent the request and goes back to the waiting state 403. It is to be noted that several Proximity tests may be performed before expiration of the time-out if several master devices answer to the Master Request message. When the predetermined time Tv has expired 406, the device checks 407 whether it has received any response from a master device. If a response has been received 408, the device checks 409 whether a local installation proposal has been received. If no local installation has been proposed 410 by a master device, then the device checks 411 whether a remote installation proposal has been received. If no remote installation has been proposed 412, this means that the device has only received negative answers (installation refused) from the master device(s) having responded to its Master Request message. In this case, the user should preferably be informed (through a user interface of the device) of this failure and the device goes back to the 'New Device' state 400.

If a remote installation 413 or a local installation 414 has been proposed to the device, it will let the user select one of the proposals 415 and run an installation protocol with the master device having sent the installation proposal to enter the 'Domain Device' state 416. Alternatively an automatic selection can be made in case the device has no user interface.

In case no response has been received 418 after expiration of the time-out Tv, the device proposes to the user to create a new network. If the user accepts, the device 419 picks at random an AD_key and initializes the counts (Local_count=1; Remote_count=0 and Total_count=1) before entering in the 'Master Device' state 420.

Figure 6:
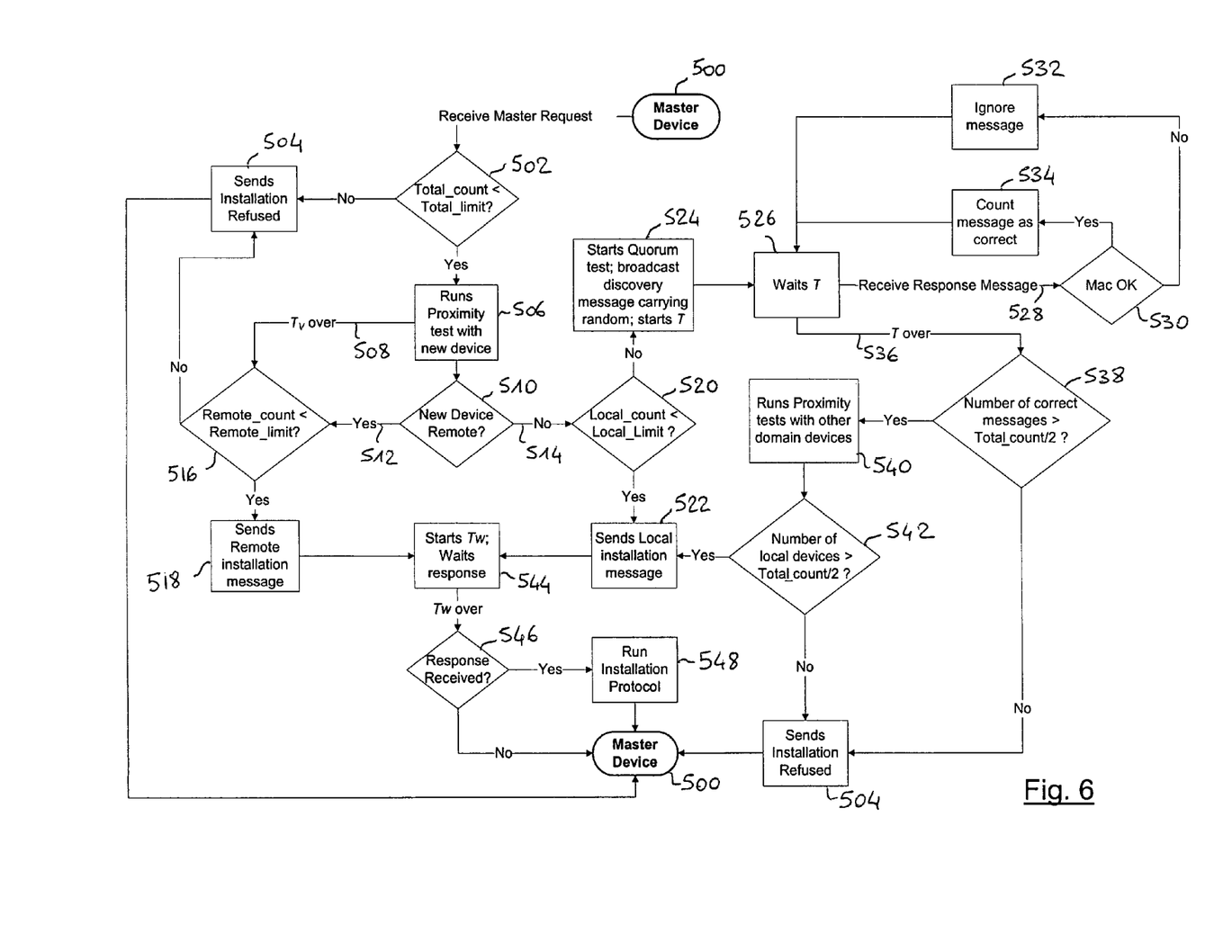

With reference to FIG. 6, the protocol of Authorized Domain size management from the standpoint of a master device will now be explained. This protocol is preferably carried out in the secure processor of the master device.

The protocol starts, from the 'Master Device' state 500, when the master device receives a Master Request from a new device requesting to be installed in the Authorized Domain. The master device first compares 502 the Total_count with the ceiling Total_limit. In case the Total_count is greater or equal to the Total_limit, the master device sends 504 a message to the requesting new device to inform it that the installation is refused and it goes back to the 'Master Device' state 500.

In case the Total_count is bellow the Total_limit, the master device launches 506 a Proximity test with the new device as explained previously. If no response is received from the new device before expiration of a predetermined time Tv 508, it is considered that the new device is remote. In case at least one response is received from the new device during the Proximity test, it is checked 510 whether the new device is remote (512) or local (514). If the new device is remote, the Remote_count is checked 516. If the Remote_count is bellow the ceiling Remote_limit, a Remote installation proposal is sent 518 to the new device. Otherwise (Remote_count equal or greater than Remote_limit), an installation refusal message is sent 504 to the new device and the master device goes back to the 'Master Device' state 500.

If the new device is local, the Local_count is checked 520. If the Local_count is bellow the Local_limit, a Local installation proposal is sent 522 to the new device. Otherwise (Local_count equal or greater than Local_limit), the master device launches 524 a quorum test by broadcasting a discovery message on the network and staring a time-out T. The master device then waits 526 during a predetermined time T. During this waiting, if a response is received 528 by any other device, the master device verifies 530 the authentication data (for example a Message Authentication Code computed using HMAC-SHA1 as explained previously) in the response message to check that the response was sent by a device belonging to the Authorized Domain. If this verification fails, the response message is ignored 532 and the master device returns to the waiting state 526. If the verification 530 succeeds, the response message is counted 534 as correct and the master device goes back to the waiting state 526.

When the predetermined time T has expired 536, the number of correct response messages received is compared 538 to the quorum necessary to pass the test. If the quorum is for example half of the Total_count, it is checked 538 that the number of correct messages is greater than Total_count/2. In an alternative, preferred, embodiment, the quorum necessary to pass the test is half of the Local_count. Should this checking fails, an installation refusal message is sent 504 to the new device and the master device goes back to the 'Master Device' state 500. Otherwise (successful checking 538), a Proximity test is run 540 with each device having sent correct response messages. At the end of these tests, only the devices in local proximity with the master device are counted to verify 542 the quorum (i.e. that the number of local devices is greater than Total_count/2 as indicated in FIG. 6, or in the alternative embodiment, greater than Local_count/2). If the quorum test finally succeeds, a local installation proposal is sent 522 to the new device; otherwise an installation refusal message is sent 504.

When either a remote installation proposal 518 or a local installation proposal 522 has been sent, the master device starts another time-out Tw and waits 544 for responses from the new device. When the predetermined time Tw has expired, the master devices checks 546 whether any response requesting installation has been received from the new device. If an installation request has been received, it runs 548 the installation protocol with the new device; otherwise, the master device goes back to the 'Master Device' state 500.

An example of ceilings value for an Authorized Domain is given bellow:
Total_limit: 20 devices
Local_limit: 6 devices
Remote_limit: 2 devices
Upper limit for the number of master splits: 2.

The two authorized remote installations (together with the two authorized splits of the master) enable the users to have a master device in their main home and in two other homes. In this kind of Authorized Domain, mobiles devices (including car devices) may be locally installed in any of the locations.

With the above values, an example of splitting would be as follows. We suppose that one time during the AD lifetime, the current values for the counts are as follows:
Total_count: 9 devices
Local_count: 8 devices (in this case, we suppose that 2 devices have been installed by passing the quorum test because Local_count>Local_limit)
Remote_count: 1 device
Number of master splits: 0.

This means that, at that time, no master splitting has already occurred, one device has been installed remotely (e.g. the TV set of the second home) and 8 devices have been installed locally (e.g. 4 TV-sets, one in the main room—the master device, one in the kitchen and one in each bedrooms, 1 DVD player in the car, 2 PC and one Portable player). We suppose that one user, Alice, wants to install a PC in her second home as well. Of course, she might install it remotely but this would mean that she would be no more able to install remote devices afterwards. She prefers thus splitting the master functionality between the TV-set in her main room and the one in her second home. To this end, she affects the following new values for counts and ceilings:

New ceilings for main room master TV: Total_limit=15, Local_limit=4, Remote_limit=2, Maximum master splits=2;
Ceilings for new master in second home: Total_limit=5, Local_limit=2, Remote_limit=0, Maximum master splits 0;
New counts for main room master TV: Total_count=8, Local_count=8, Remote_count=0, master splits=1;
New counts for new master in second home: Total_count=1, Local_count=1, Remote_count=0, master splits=0.

With these values, Alice will be able to install up to 4 devices in its second home without any problem. It is to be noted that the second device to be installed in the second home will be installed without passing the quorum test, while the following will require it (because the Local_limit will be reached).

Now, an example of re-balancing will be given. We suppose that the user, Alice, has the same configuration as above (before the splitting). Values of counters are as follows:
Total_count: 9 devices
Local_count: 8 devices
Remote_count: 1 device
Number of master splits: 0.

During a professional travel, she buys a new portable player (the other one is her daughter's) and of course she cannot wait being back home to enjoy her new device. She installed it thus remotely (new values for counter are:
Total_count: 10 devices
Local_count: 8 devices
Remote_count: 2 devices
Number of master splits: 0).

When she is back home, she connects the portable player to her home network. The master TV-set detects that a device has connected and discovers which devices are locally connected to the network. It counts 9 devices (we suppose at this time that the car is just in front of the house) while the current count for local devices is 8 only. The master device thus concludes that one remotely installed device is now local and decides to update the counts provided that one of the following conditions is met:
the Local_count is lower than the Local_limit or
if the Local_count is equal to or greater than the Local_limit and the quorum test (based e.g. on half of the Local_count) passes as explained previously.

In this case, Local_count is set to the number of local devices currently present while Remote_count is set to the difference between total and (new) local counts. New counts are now:
Total_count: 10 devices
Local_count: 9 devices
Remote_count: 1 device
Number of master splits: 0.

Thanks to the re-balancing mechanism, Alice will still enjoy the possibility to install remotely devices. Without it, Alice should have waited being back home to install her new portable player in order not to lose this possibility.

The advantages of the invention are as follows:
high flexibility: a normal user is able to install mobile devices, and devices in a second home without any constraint;

control over remote installation: dishonest users will be limited in their ability to install devices in multiple remote locations; Security: the solution cannot be easily circumvented.

The invention claimed is:

1. Method for controlling a number of devices installed in an Authorized Domain containing at least one master device, the method comprising the steps of:
   storing, by said master device, ceiling values for:
   a total number Total_limit of devices to be installed in the Authorized Domain;
   a total number Local_limit of devices to be installed in a local proximity with the master device;
   a total number Remote_limit of devices to be installed remotely from said master device;
   a current value of a number Local count of devices installed in the Authorized Domain in local proximity with the master device; and
   a current value of a number Remote count of devices installed in the Authorized Domain remotely from said master device;
   when the master device receives an installation request from a new device, verifying that the ceiling value for the Total_limit has not been reached and,
   in case of positive verification, checking whether the new device is in local proximity with the master device and,
   in case the new device is found to be in local proximity, verifying that the ceiling value for the Local_limit has not been reached by the number Local count before allowing local installation,
   in case the new device is found to be remote, verifying that the ceiling value for the Remote_limit has not been reached by the number Remote count before allowing remote installation.

2. Method according to claim 1, wherein the ceiling value Local_limit is greater than the ceiling value Remote_limit.

3. Method according to claim 1, wherein the ceiling value Total_limit is greater than the sum of the ceiling values Local_limit and Remote_limit.

4. Method according to claim 1, further comprising, in case the new device is found to be local and in case the number Local_count is equal to or greater than the Local_limit, a step of checking that the number of devices installed in the Authorized Domain, and which are connected at this time in local proximity with the master device, is greater than a predetermined quorum of the number Local_count;
   wherein the new device is locally installed should said checking be positive.

5. Method according to claim 4, wherein the step of checking that the number of devices installed in the Authorized Domain, and which are connected at this time in local proximity with the master device, is greater than a predetermined quorum of the Local_count, comprises:
   broadcasting a discovery message containing an Authorized Domain identifier and a random number to all the devices of the Authorized Domain;
   receiving messages from the devices of the Authorized Domain containing said random number and an identifier of the responding device, said message being protected by authentication data;
   verifying the validity of the received messages using the authentication data;
   and for each of the valid message received from a device of the authorized Domain,
   checking whether the device having sent the valid message is in local proximity with the master device; counting the number of devices having sent valid messages that are in local proximity with the master device;
   and checking that said number is greater than the predetermined quorum of the Local_count.

6. Method according to claim 4, wherein the predetermined quorum of the Local_count is half the Local_count.

7. Method according to claim 4, wherein the predetermined quorum is based on the total number Total_count of devices installed in the Authorized Domain instead of the Local_count.

8. Method according to claim 4, wherein :
   the Local_count is incremented when the new device is installed locally; or
   the Remote_count is incremented when the new device is installed remotely.

9. Method according to claim 8, wherein the Local_count or the Remote_count are incremented only when the new device is able to consume and/or to export content.

10. Method according to claim 9, wherein the Local_count or the Remote_count are incremented by one unit when the new device is able to consume and to export content.

11. Method according to claim 9, wherein when a device that was installed remotely in the Authorized Domain is found to be in local proximity with the master device, then the Local_count is incremented while the Remote_count is decremented.

12. Method according to claim 4, wherein said method comprises a step of splitting the master device functionality between two apparatuses,
   said splitting step comprising splitting the ceiling values Total_limit, Local_limit and Remote_limit and the current values Local_count and Remote_count being between the two master devices.

13. Method according to claim 12 wherein the number of authorized split of the master device functionality is limited to a predetermined number.

14. Apparatus containing master device functionality for controlling a number of devices installed in an Authorized Domain, comprising:
   a memory configured to store ceiling values for:
   a total number Total_limit of devices to be installed in the Authorized Domain;
   a total number Local_limit of devices to be installed in a local proximity with a master device and
   a total number Remote_limit of devices to be installed remotely from said master device; and
   the memory further being configured to storeable to store current values of:
   a number Local_count of devices installed in the Authorized Domain in local proximity with the master device; and
   a number Remote_count of devices installed in the Authorized Domain remotely from said master device; and
   a processor configured to control installation of new devices in the Authorized Domain by verifying that the ceiling value for the Total limit has not been reached when the master device receives an installation request from a new device and,
   in case of positive verification, checking whether the new device is in local proximity with the master device and,
   in case the new device is found to be in local proximity, verifying that the ceiling value for the Local limit has not been reached by the number Local count before allowing local installation, in case the new device is found to be remote, verifying that the ceiling value for the Remote limit has not been reached by the number Remote count before allowing remote installation.

* * * * *